(12) United States Patent
Erikstrup et al.

(10) Patent No.: US 7,074,347 B2
(45) Date of Patent: Jul. 11, 2006

(54) PROCESS FOR THE PREPARATION OF SYNTHESIS GAS

(75) Inventors: Niels Erikstrup, Frederiksberg (DK); Thomas Rostrup-Nielsen, Holte (DK); Peter Seier Christensen, Copenhagen NV (DK); Jens-Henrik Bak Hansen, Frederiksberg (DK); Ib Dybkjer, Copenhagen Ø (DK); Kim Aasberg-Petersen, Holte (DK)

(73) Assignee: Haldor Topsoe A/S, Lyngby (DK)

( * ) Notice: Subject to any disclaimer, the term of this patent is extended or adjusted under 35 U.S.C. 154(b) by 322 days.

(21) Appl. No.: 10/669,375

(22) Filed: Sep. 25, 2003

(65) Prior Publication Data

US 2004/0063798 A1 Apr. 1, 2004

(30) Foreign Application Priority Data

Sep. 26, 2002 (DK) ............................. 2002 01433
Sep. 26, 2002 (DK) ............................. 2002 01434

(51) Int. Cl.
*C01B 3/26* (2006.01)
(52) U.S. Cl. ........................................ 252/373
(58) Field of Classification Search ............. 252/373
See application file for complete search history.

(56) References Cited

U.S. PATENT DOCUMENTS

| | | | | |
|---|---|---|---|---|
| 4,788,004 A | * | 11/1988 | Pinto et al. ................. | 252/373 |
| 4,822,521 A | * | 4/1989 | Fuderer ...................... | 252/376 |
| 4,927,857 A | * | 5/1990 | McShea et al. ............. | 518/703 |
| 5,011,625 A | * | 4/1991 | Le Blanc .................... | 252/373 |
| 5,068,058 A | * | 11/1991 | Bushinsky et al. ......... | 252/376 |
| 5,861,441 A | * | 1/1999 | Waycuilis ................... | 518/703 |
| 6,123,873 A | * | 9/2000 | Primdahl .................... | 252/376 |
| 6,224,789 B1 | * | 5/2001 | Dybkj.ae butted.r ......... | 252/373 |
| 6,375,916 B1 | * | 4/2002 | Christensen et al. ...... | 423/418.2 |
| 6,444,712 B1 | | 9/2002 | Janda | |
| 6,726,851 B1 | * | 4/2004 | Thomsen ..................... | 252/373 |
| 6,730,285 B1 | * | 5/2004 | Aasberg-Petersen et al. ............ | 423/652 |

(Continued)

FOREIGN PATENT DOCUMENTS

| | | | | |
|---|---|---|---|---|
| DE | 3345064 | * | 6/1985 | ................. 252/373 |
| WO | WO 00/58242 A | | 10/2000 | |

OTHER PUBLICATIONS

J. R. Rostrup-Nielsen et al., "$CO_2$ Reforming of Methane Over Transition Metals", *Journal Catalysis* 144, pp. 38-49 (1993), no month.

(Continued)

*Primary Examiner*—Wayne A. Langel
(74) *Attorney, Agent, or Firm*—Dickstein Shapiro Morin & Oshinsky LLP

(57) ABSTRACT

Process for the production of synthesis gas by catalytic steam reforming of a hydrocarbon containing feedstock in parallel in an autothermal steam reformer and in one or more steam reformers in series, the heat for the steam reforming reactions in the one or more steam reformers being provided by indirect heat exchange with the combined effluents from the one or more steam reformers with the autothermal steam reformer, and wherein carbon monoxide containing gas is added to the feedstock prior to the steam reforming in the autothermal steam reformer and/or prior to the steam reforming in the one or more steam reformers, the carbon monoxide containing gas having a molar ratio of hydrogen to carbon of less than 4.5 and being added in an amount resulting in a product stream having a molar ratio of hydrogen to carbon monoxide of between about 1.8 and 2.3.

10 Claims, 2 Drawing Sheets

U.S. PATENT DOCUMENTS

| | | | |
|---|---|---|---|
| 6,749,829 B1 * | 6/2004 | Briscoe | 423/651 |
| 6,773,691 B1 * | 8/2004 | Ramani et al. | 423/651 |
| 6,818,198 B1 * | 11/2004 | Singh et al. | 423/652 |
| 6,855,272 B1 * | 2/2005 | Burlingame et al. | 252/373 |
| 6,908,571 B1 * | 6/2005 | Primdahl et al. | 252/373 |
| 2001/0051662 A1 | 12/2001 | Beer | |
| 2002/0006968 A1 | 1/2002 | Abbott | |

OTHER PUBLICATIONS

T. S. Christensen, "Adiabatic Prereforming of Hydrocarbons—An Important Step in Syngas Production", *Applied Catalysis A: General* 138, pp. 285-309 (1996), no month.

* cited by examiner

PROCESS FOR THE PREPARATION OF SYNTHESIS GAS

DESCRIPTION OF THE INVENTION

The invention concerns a process for the preparation of synthesis gas by parallel steam reforming of a hydrocarbon containing feedstock in a autothermal reformer (ATR) and in a series of adiabatic steam reformers and/or heat exchange reformers with addition of carbon monoxide containing gas to the feedstock.

BACKGROUND OF THE INVENTION

A plant for production of synthetic diesel and other synthetic hydrocarbons consists of three main parts. In the first main unit, synthesis gas (a mixture of hydrogen and carbon oxides) is produced from the feedstock which is usually natural gas or a similar light hydrocarbon feedstock. In the second main unit, the actual hydrocarbon synthesis takes place usually by the Fischer-Tropsch synthesis. In the final part often known as the Product Workup unit (PWU) the raw products are refined and/or separated to give the desired end products. The present invention relates to an improved method for production of synthesis gas.

Today, one of the most cost effective and efficient methods for production of synthesis gas is by Autothermal Reforming (ATR). In ATR the light hydrocarbon feedstock with addition of steam reacts with a sub-stoichiometric amount of oxygen to produce synthesis gas. An ATR reactor consists of a burner, a combustion chamber and a catalyst bed in a refractory lined pressure shell.

For the Fischer-Tropsch synthesis to be as effective as possible, a specific synthesis gas composition is often desired. In many cases the desired synthesis gas composition is given by the ratio of the content of hydrogen to the content of carbon monoxide. The desired ratio is often approximately 2.0. With most operating conditions ATR is not able to produce this ratio. Instead a carbon dioxide containing stream must be recirculated to a location upstream the ATR reactor. This recirculation stream is often a tail gas, which is essentially a by-product from the Fischer-Tropsch synthesis unit and/or the Product Work-up unit. The main components in the tail gas are carbon monoxide, carbon dioxide, hydrogen and various light hydrocarbons such as methane, ethane, propane, ethylene and propylene.

Often, as described in the art (e.g. U.S. Pat. No. 6,375,916), an adiabatic prereformer is added upstream the autothermal reformer. In the pre-reformer the following reactions take place:

$$C_nH_m + nH_2O \Rightarrow nCO + \tfrac{1}{2}(m+2n)H_2 \quad (n \geq 2) \tag{1}$$

$$3H_2 + CO \Leftrightarrow CH_4 + H_2O \tag{2}$$

$$CO + H_2O \Leftrightarrow H_2 + CO_2 \tag{3}$$

At most conditions higher hydrocarbons (hydrocarbons with more than 1 carbon atom) are completely removed. The last two reactions (2) and (3) are close to thermodynamic equilibrium at the exit temperature of the adiabatic prereformer. Typically, the catalyst in the adiabatic prereformer is nickel on a ceramic carrier.

It is described in U.S. patent application Ser. No. 20010051662 by Arcuri et al. that mixing of tail gas and a hydrocarbon feedstock and feeding the resultant mixture to an adiabatic pre-reformer is advantageous for production of synthesis gas. However, according to the present invention, recirculation of the tail gas to the feed to the adiabatic prereformer is disadvantageous because the risk of carbon formation will be higher in the prereformer. This means that the process must be operated at a higher steam to carbon ratio (ratio of steam to carbon in hydrocarbons) to avoid carbon formation. It is generally recognised that operation at a low steam-to-carbon ratio is beneficial to the economics in a Fischer-Tropsch plant.

Steam reforming involves the risk of detrimental carbon formation on the catalyst. Carbon may deposit on the catalyst either from methane, carbon monoxide, higher paraffinic hydrocarbons, or other components such as olefins.

For methane the carbon forming reaction may be expressed by:

$$CH_4 \Leftrightarrow C + 2H_2 \tag{4}$$

The composition assuming chemical equilibrium of the steam reforming and shift reactions (1–3) is calculated based on the feed stream composition and the temperature and pressure. This should in principle be done at each position in the reactor. However, experience shows that the risk of carbon formation from methane according to reaction (4) increases with temperature. Based on the calculated equilibrium composition, the reaction quotient for reaction (4) is calculated. The reaction quotient, $Q_c$, is the ratio of the square of the partial pressure of hydrogen to the partial pressure of methane ($P^2_{H2}/P_{CH4}$). If the ratio is higher than the equilibrium constant for reaction (4) at the same temperature, carbon is not predicted to form.

One method for reducing the required amount of steam without carbon formation is to use noble metal catalysts (Rostrup-Nielsen et al., J. of Catalysis 144, pages 38–49, 1993). However, the cost of noble metals as compared to nickel is very high and it is desirable to minimise the amount of catalyst.

Synthesis gas production may account for more than 50% of the total capital cost in a Fischer-Tropsch plant. For a plant based on ATR a large fraction of the cost of the synthesis gas production unit arises from the air separation unit needed to produce oxygen. Hence, there is a considerable interest in methods for reducing the oxygen consumption per unit of synthesis gas produced.

SUMMARY OF THE INVENTION

According to the present invention, a method is described by which operation at low steam-to-carbon ratio without carbon formation is possible while at the same time reducing the oxygen consumption.

The installation of a heat exchange steam reforming unit (HESRU) in parallel with the ATR is one method for increasing the synthesis gas production without the corresponding need for a larger air separation unit. In this case the feed (typically a mixture of desulphurised natural gas and steam or a pre-reformed mixture) is split between the ATR and the HESRU. The tail gas is added either to the ATR feed stream, the HESRU feed stream or to both feed streams. The effluents from the ATR and the HESRU are combined to give the synthesis gas, which is sent to the Fischer-Tropsch synthesis section.

In the HESRU the endothermic steam reforming reaction of the hydrocarbons take place as illustrated below using methane as an example:

$$CH_4 + H_2O \Leftrightarrow 3H_2 + CO \tag{5}$$

The steam reforming reactions are accompanied by the water gas shift reaction:

$$CO + H_2O \Leftrightarrow H_2 + CO_2 \tag{3}$$

The above two reactions are close to equilibrium at the HESRU outlet. The temperature of the exit gas is above 800° C. to ensure a satisfactory methane conversion. The amount of tail gas added is adjusted to give the desired exit gas composition. Typically, the installation of the HESRU will increase the amount of tail gas recirculated to the process.

The HESRU itself may be quite cost intensive and methods for reducing the size are desired.

The invention concerns a process for the production of synthesis gas by catalytic steam reforming of a hydrocarbon containing feedstock in parallel in an autothermal steam reformer and in one or more steam reformers in series, the heat for the steam reforming reactions in the one or more steam reformers being provided by indirect heat exchange with the combined effluents from the one or more steam reformers with the autothermal steam reformer, and wherein carbon monoxide containing gas is added to the feedstock prior to the steam reforming in the autothermal steam reformer and/or prior to the steam reforming in the one or more steam reformers, the carbon monoxide containing gas having a molar ratio of hydrogen to carbon of less than 4.5 and being added in an amount resulting in a product stream having a molar ratio of hydrogen to carbon monoxide of between about 1.8 and 2.3.

DETAILED DESCRIPTION OF THE PREFERRED EMBODIMENTS

Figure 1:
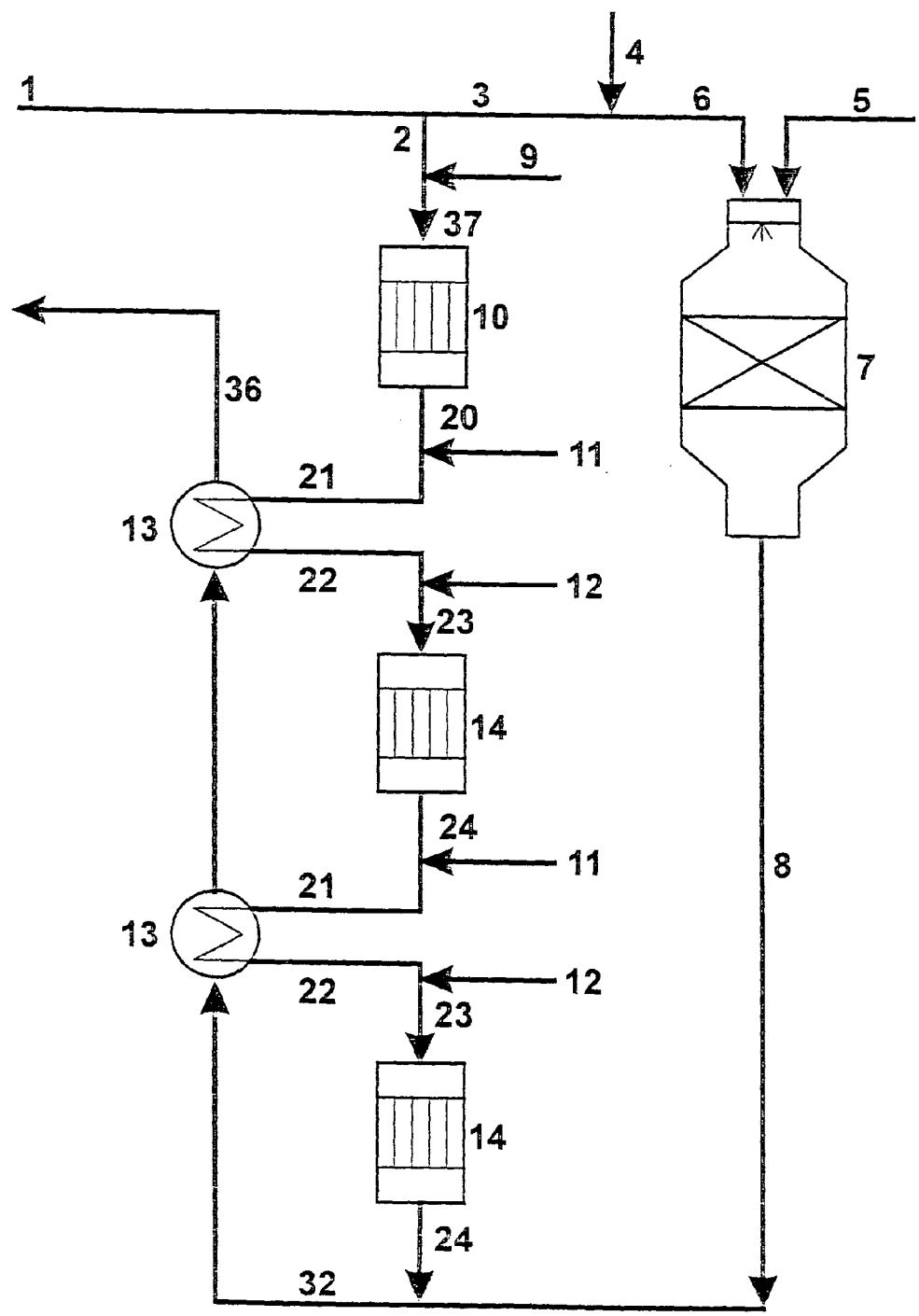
FIG. 1 is a schematic diagram of the process for the production of synthesis gas by catalytic steam reforming according to one embodiment of the present invention, wherein the steam reformers are adiabatic steam reformers.

The above aspects and features are disclosed in greater detail in the following description by reference to the drawings in which FIG. 1 shows a specific embodiment of the invention.

In this embodiment the steam reformers are adiabatic steam reformers.

A hydrocarbon containing feed stream 1 is divided into a feed stream 3 for the ATR and a feed stream 2 for the adiabatic reformers 10, 14. Optionally, stream 3 can be pre-reformed and/or further heated (not shown in FIG. 1). The pre-reforming is in this case carried out by an adiabatic prereformer as described in the art (e.g. Christensen, Appl. Cat. A 138, page 285, 1996).

The stream 3 is optionally mixed with a tail gas 4 resulting in a feed stream 6 for the ATR 7. Oxidant 5 either in the form of air or oxygen or mixtures thereof is fed to the ATR 7 in which synthesis gas is produced and withdrawn through line 8.

Tail gas 9 is optionally added to the feed stream 2 resulting in feed stream 37 for adiabatic reactor 10. In adiabatic reactor 10, steam reforming, methanation and shift reactions occur as follows:

$$C_nH_m + nH_2O \Rightarrow nCO + \tfrac{1}{2}(m+2n)H_2 \tag{1}$$

$$3H_2 + CO \Leftrightarrow CH_4 + H_2O \tag{2}$$

$$CO + H_2O \Leftrightarrow H_2 + CO_2 \tag{3}$$

Product gas 20 is withdrawn from reactor 10. Gas stream 20 is subjected to a series of identical and sequential steps as follows:

Addition of tail gas 11 resulting in a mixed stream 21.

Increasing the temperature of stream 21 in heat exchanger 13 resulting in stream 22.

Optional addition of tail gas 12 resulting in mixed stream 23.

Processing of stream 23 in adiabatic reactor 14 in which the following reactions occur:

$$C_nH_m + nH_2O \Rightarrow nCO + \tfrac{1}{2}(m+2n)H_2 \tag{1}$$

$$3H_2 + CO \Leftrightarrow CH_4 + H_2O \tag{2}$$

$$CO + H_2O \Leftrightarrow H_2 + CO_2 \tag{3}$$

Withdrawing the product from adiabatic reactor 14 in stream 24.

The number of steps is adjusted until a predetermined gas composition and temperature is reached. The product stream 24 from the final adiabatic reactor 14 is mixed with the product stream 8 from the ATR resulting in synthesis gas stream 32. The synthesis gas 32 is cooled in one or several heat exchangers 13 providing the heat for the increase in temperature of stream(s) 21 as described above. The cooled stream 36 is the product synthesis gas.

In another embodiment of the invention the duty for the heating of process stream(s) 21 may partially or completely be obtained from other streams in the Fischer-Tropsch complex. This depends upon the optimal heat integration in the given plant.

The total amount of tail gas added in stream 4, 9, 11 and 12 is adjusted to give the desired product synthesis gas composition typically with a hydrogen to carbon monoxide ratio between 1.8 and 2.3.

Figure 2:
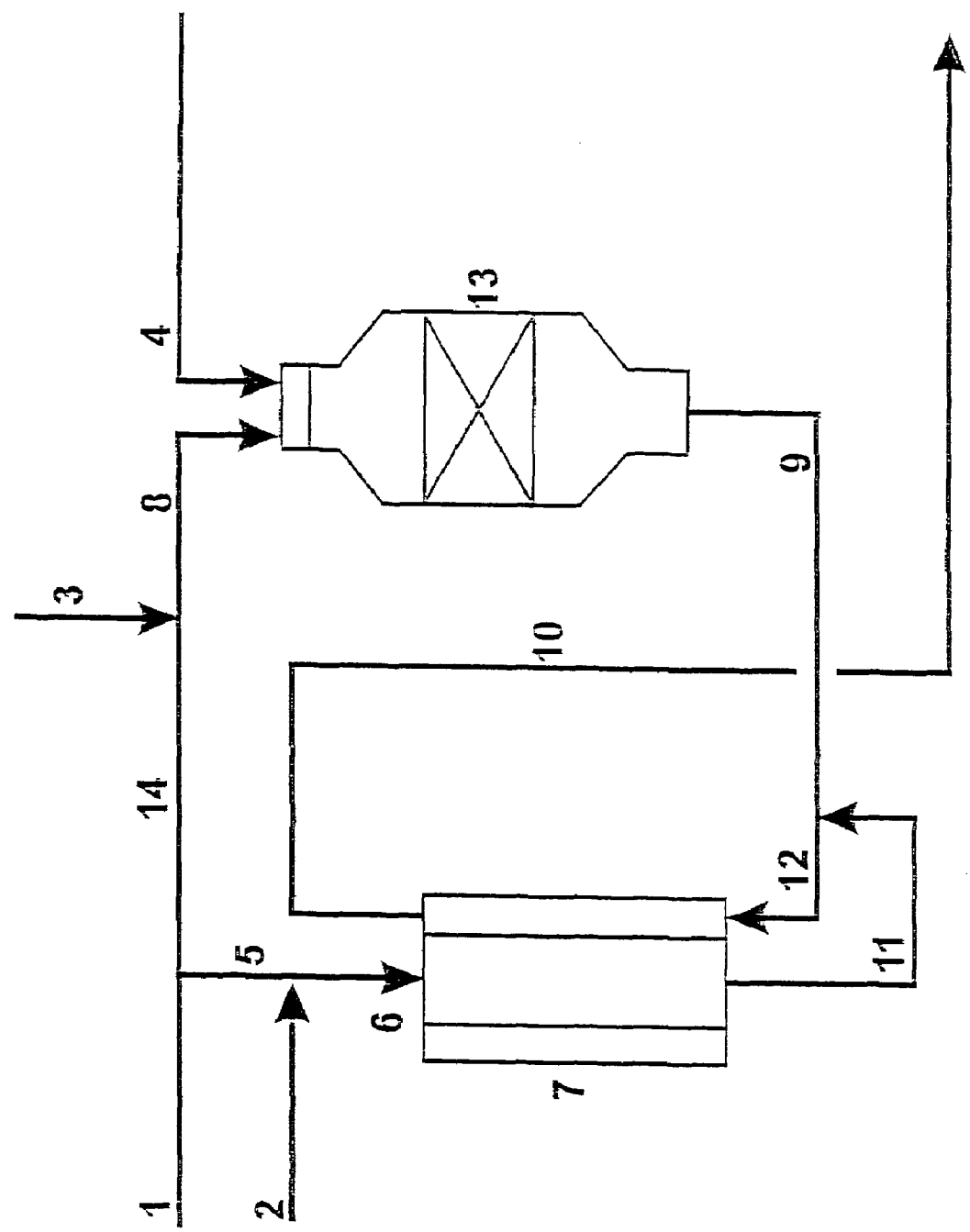
FIG. 2 is a schematic diagram of the process for the production of synthesis gas by catalytic steam reforming according to another embodiment of the present invention, wherein the steam reformers are heat exchange steam reformers.

The following embodiments of the invention are illustrated in FIG. 2.

In this embodiment the steam reformers are heat exchange steam reformers.

A preformed hydrocarbon stream is split into a stream for the Autothermal Reforming and a stream for the HESRU. The HESRU consists of heat exchange reformer. The heat for the heat exchange reformer is supplied by indirect heat exchange by a mixture of the effluent from the ATR and the effluent from the heat exchange reformer. The tail gas is added to the ATR feed and/or the feed to the heat exchange reformer and/or to the effluent from the heat exchange reformer.

In yet another embodiment of the present invention a preformed hydrocarbon stream is split into a stream for the Autothermal Reforming and a stream for the HESRU. The stream for the HESRU is heated and fed to an adiabatic reformer. The effluent from this adiabatic reformer is optionally further heated and then fed to a heat exchange reformer. The effluent from the heat exchange reformer and the ATR are combined. The combined stream is used as heat source for the heat exchange reformer and/or the preheating of the feed to the adiabatic reformer and/or the preheating of the feed to the heat exchange reformer. The tail gas is added to the feed to the ATR and/or to the feed to the adiabatic reformer and/or to the feed to the heat exchange reformer and/or to the heat exchange reformer effluent.

The hydrocarbon containing feedstock can for instance be a mixture of natural gas, steam and hydrogen.

It is hardly possible to produce a synthesis gas with a composition of $H_2/CO$ of approximately 2 without recycle. This can be understood from the following simplified explanation.

The desired product has a ratio of atomic hydrogen to atomic carbon $(H/C)_{product}$ of approximately 4. The feed consisting of natural gas (or other light hydrocarbon component) and steam has a $(H/C)_{feed}$ ratio of typically 4.5–7.5 depending on the steam-to-carbon ratio and the hydrocarbon stream composition. As an example a mixture of 100 moles methane and 60 moles steam corresponding to a steam-to-carbon ratio of 0.60 will have an atomic (H/C) ratio of 5.20.

The $(H/C)_{product}$ is lower than $(H/C)_{feed}$ and hence addition of a (recycle) stream with an atomic (H/C) ratio less than $(H/C)_{product}$ is needed. The desired $H_2/CO$ ratio in the product gas may often be between 1.7 and 2.3 corresponding to $(H/C)_{product}$ equal to 3.4–4.6.

It is recognized that the above is a simplified representation (e.g. since some of the carbon in the feed will remain in methane or be converted into carbon dioxide).

However, for practical applications this explanation is suitable and the ratio of atomic hydrogen to atomic carbon in the recycle gas must be equal to or below 4.5 $((H/C)_{recycle} <= 4.5)$ The catalytic activity for steam reforming in the adiabatic reformers and/or heat exchange reformers can be obtained either by conventional fixed beds of (pellet) catalysts, by catalysed hardware, or by structured catalysts. In case of catalysed hardware, catalytic material is added directly to a metal surface. The catalytic coating of a metal surface (wash coating) is a well known process (a description is given in e.g. Cybulski, A., and Moulijn, J. A., Structured catalysts and reactors, Marcel Dekker, Inc, New York, 1998, Chapter 3, and references herein).

The appropriate material, preferable a ferritic steel containing Cr and/or Al, is heated to a temperature preferably above 800° C. in order to form a layer of Cr and/or Al oxide. This layer facilitates a good adhesion of the ceramic to the steel. A thin layer of a slurry containing the ceramic precursor is applied on the surface by means of e.g. spraying, painting or dipping. After applying the coat the slurry is dried and calcined at a temperature usually in the region 350–1000° C. Finally the ceramic layer is impregnated with the catalytic active material.

Alternatively the catalytic active material is applied simultaneously with the ceramic precursor.

Further catalyst hardware is in form of catalyst being deposited in metallic or ceramic structure, which is adhered to wall of the reactor.

Catalysed hardware can in the present invention either be directly to a channel wall in which the process gas flows or attached to a metallic structured element forming a structured catalyst.

Structured elements are devices comprising a plurality of layers with flow channels present between the adjoining layers. The layers are shaped in such a way that placing the adjoining layers together results in an element in which the flow channels can, for instance, cross each other or can form straight channels. Structured elements are further described in for instance U.S. Pat. Nos. 5,536,699, 4,985,230, EP patent application Nos. 396,650, 433,223 and 208,929, all of which are incorporated herein by reference.

Two types of structured elements are particularly suitable for the inventive process—the straight-channelled elements and the cross-corrugated elements.

The straight-channelled elements require adiabatic conditions and various geometries of these elements are possible. For example, straight channel monoliths are suitable for use in the process of the invention in the adiabatic reactor(s).

Cross-corrugated elements allow efficient heat transfer from the reactor wall to the gas stream. They are also suitable for use in the process of the invention especially in the sections with heat exchange.

Other catalysed structured elements can also be applied in the process of the invention such as high surface structured elements. Examples of structured catalysts includes catalysed monoliths, catalysed cross-corrugated structures and catalysed rings (e.g pall-rings).

Both with catalysed hardware applied directly to the wall of the reactor and with structured catalysts, the amount of catalyst can be tailored to the required catalytic activity for the steam reforming reactions at the given operating conditions. In this manner the pressure drop is lower and the amount of catalyst is not more than needed which is especially an advantage if the costly noble metals are used.

In more conventional applications with pellets, the steam reforming reactors are often designed to maximise heat transfer and pellets are simply placed in channels where the process gas flows often resulting in a vast excess of catalytic activity.

In yet another aspect of the present invention, the flow through the catalyst may be upflow when catalyst hardware or structured catalysts are used. This can hardly be done in the case of pellets due to the risk of fluidisation. One advantage of this specific embodiment is that substantial degree of piping may be avoided reducing plant cost.

Another possibility is that the tube diameter can be reduced by use of catalysed hardware. It is generally recognised that the ratio of the tube diameter to the diameter of catalyst pellets should be above 4–5. To avoid excess pressure drops this minimises the acceptable diameter of the tube (or other channel geometry). With a structured catalyst or with catalysed hardware this constraint is eliminated opening the possibility for more compact reformers.

Similar advantages can be obtained if the structured catalyst is in the form of ceramic monoliths or ceramic cross-corrugated structures with active catalyst material The catalytic material itself may be either nickel or noble metals (Pt, Pd, Ru, Rh, Ir) or mixtures thereof.

The advantages of the inventive process also include the ability to operate at lower steam-to-carbon ratio and reduce the oxygen consumption.

The advantages of the inventive process (eg as shown in FIG. 1) are several. In the case where more than one reactor is used the heat transfer and the chemical reactions are decoupled making it possible to optimise both individually. In addition the change of catalyst is easier than with an integrated apparatus. The fact that several reactors are employed means that the catalyst can be tailored more specifically to the given operating conditions. As an example of this nickel based catalysts could be used at the relative low temperatures while noble metals can be used at higher temperatures to avoid carbon formation.

The heat exchange reformer, if used, may also be loaded with nickel based catalysts in the colder zone and noble metals in the warmer zone where the risk of carbon formation is most pronounced.

The use of several heat exchangers may facilitate the use of materials tailored to the operating conditions. Specifically, the choice of materials may be adjusted to the temperature in each exchanger. Also, metal dusting corrosion must be considered at these operating conditions. In some of the heat exchangers the risk of metal dusting is more pronounced than in others. In these exchangers materials with high resistance to metal dusting should be applied, while this may not be necessary in other cases.

The use of several locations to inject tail gas into the process gas streams has the advantage that the risk of carbon formation on the catalyst is reduced. Carbon formation may occur from higher hydrocarbons (hydrocarbon compounds with 2 or more carbon atoms) according to the following reaction:

$$C_nH_m \Rightarrow nC + \tfrac{1}{2}mH_2 \qquad (6)$$

Especially olefins may even in small concentration be the cause for detrimental carbon formation on the catalyst. It is known that increasing the hydrogen-to-olefin ratio has a positive effect on avoiding carbon formation. With a split of the tail gas the hydrogen-to-olefin ratio increases at the inlet to each of the adiabatic reactors because no olefins are present in the natural gas feed stream

EXAMPLES

Natural gas with a composition of 95% methane, 3.5% ethane, and 1.5% propane is used. In all cases the amount of natural gas feed has been maintained at 1000 Nm³/hr. A small flow of hydrogen of 20 Nm³/hr is added to the natural gas in all cases. The steam to carbon (S/C) ratio is defined as the molar ratio of steam to carbon derived from hydrocarbons in the natural gas (i.e. excluding carbon in tail gas) The tail gas used in all the examples has the composition given in Table 1. In all the examples the tail gas temperature is 200° C. and the oxidant temperature is 200° C.

TABLE 1

| Compound | Tail Gas Concentration (mole %) |
|---|---|
| Hydrogen | 31.1 |
| Carbon Monoxide | 27.8 |
| Methane | 3.7 |
| Nitrogen | 4.0 |
| Carbon Dioxide | 30.4 |
| Ethane | 1.5 |
| Ethylene | 1.5 |
| Propane | 0.0 |
| Propylene | 0.0 |

Example 1A

Comparative Example

In this case desulphurised natural gas is mixed with steam and tail gas having the composition defined above. The resultant mixture is heated to 430° C. and fed to an adiabatic pre-reformer. The pre-reformed mixture is heated to 600° C. The resultant mixture is fed to the Autothermal Reformer together with an oxidant (oxidant composition: 99.5% oxygen and 0.5% Argon) in which the synthesis gas is produced. The feed temperature of the oxygen is 200° C. The amount of tail gas added is adjusted to give a hydrogen-to-carbon monoxide ratio in the synthesis gas stream equal to 2.00. The ATR effluent temperature is 1050° C. All reactions are assumed to be in equilibrium at reactor outlet conditions. The pressure throughout the system is 2.48 MPa. The tail gas temperature is 200° C.

The steam-to-carbon ratio is 0.6.

Example 1B

In this case desulphurised natural gas and steam is mixed and heated to 430° C. and fed to an adiabatic prereformer. The steam to carbon ratio at the prereformer inlet is 0.6. The effluent of the adiabatic prereformer is split in two streams. The first stream amounting to 80% of the total prereformer effluent stream is heated to 600° C. This heated stream is mixed with tail gas having the composition given in Table 1 and fed to the Autothermal Reformer together with oxidant.

The second stream amounting to 20% of the total prereformer effluent stream is mixed with additional steam. The amount of steam is 213 Nm³/hr. The resultant mixture is heated to 500° C. and fed to an adiabatic reactor. The effluent from the adiabatic reactor is further heated to 550° C. and fed to a heat exchange reformer. The effluent from the heat exchange reformer is 900° C. The effluent from the heat exchange reformer and from the Autothermal reformer are mixed into the final synthesis gas.

The amount of tail gas is adjusted to give a ratio of hydrogen to carbon monoxide in the effluent stream of 2.00.

Example 1C

This example is almost identical to Example 1B. The only difference is that no tail gas is added to the feed stream to the ATR. Instead tail gas is added to the second stream amounting to 20% of the total prereformer effluent stream and which is mixed with additional steam. The resultant mixture is heated to 500° C. as in Example 1B.

The amount of tail gas is adjusted to give a ratio of hydrogen to carbon monoxide in the effluent stream of 2.00.

Example 1D

Example 1D is similar to Example 1C. The only difference is that tail gas is added to the effluent stream from the adiabatic reactor before heating of this stream to 550° C. No tail gas is added upstream the adiabatic reactor. The amount of tail gas is adjusted to give a ratio of hydrogen to carbon monoxide in the effluent stream of 2.00.

Example 1E

This example is similar to the preceding examples 1B, 1C and 1D. 30% of the tail gas is added in the location described in Example 1B, 30% in the location described in section 1C and 40% in the location described in Example 1D.

The amount of tail gas is adjusted to give a ratio of hydrogen to carbon monoxide in the effluent stream of 2.00.

Example 1F

This example is identical to Example 1E, except that the steam to carbon ratio upstream the prereformer has been set to 0.40.

In Tables 2a and 2b the production of synthesis gas (hydrogen and carbon monoxide) for Examples 1A–1F is given relative to the natural gas and oxygen consumption. Also shown is the amount of tail gas recycled and the temperature of the synthesis gas (i.e. of the mixture of the effluent gases from the ATR and the heat exchange reformer) in Examples 1B–1F.

TABLE 2a

| Example | Synthesis gas production (Nm3 syngas produced/Nm3 oxygen consumed) | Synthesis gas production (Nm3 syngas produced/Nm3 natural gas consumed) | Tail gas recycle (mole/mole natural gas feed) |
|---|---|---|---|
| 1A | 5.03 | 3.14 | 0,29 |
| 12 | 6,33 | 3,34 | 0,51 |
| 1C | 7,36 | 3,42 | 0,61 |
| 1D | 7,36 | 3,42 | 0,61 |
| 1E | 6,96 | 3,38 | 0,57 |
| 1F | 6,83 | 3,23 | 0,42 |

TABLE 2b

| Example | Synthesis gas temperature (° C.) |
|---|---|
| 1A | — |
| 1B | 1020 |
| 1C | 997 |
| 1D | 997 |
| 1E | 1005 |
| 1F | 1006 |

In Table 3 below, the given inlet and outlet temperatures for Examples 1A–1E of the adiabatic prereformer are given. The calculated reaction quotients at chemical equilibrium for the carbon formation reaction (5) from methane is also given at the inlet and outlet temperatures.

The equilibrium constant for reaction (5) at the inlet and outlet temperatures are also given assuming that carbon is in the form of graphite. It is recognised that the true equilibrium constant for carbon formation on a catalyst is different and to some extent depending upon the catalyst.

However, for comparative and illustrative purposes, the use of the equilibrium constant for graphite is adequate.

TABLE 3

| Case | $T_{inlet}$ (° C.) | $T_{exit}$ (° C.) | $Q_{c, in}$ (atm.a) | $Q_{c, out}$ (atm.a) | $K_{p, in}$ (atm.a) | $K_{p, out}$ (atm.a) |
|---|---|---|---|---|---|---|
| 1A | 430 | 493 | 0.074 | 0.25 | 0.122 | 0.41 |
| 1B | 430 | 410 | 0,155 | 0,11 | 0.122 | 0.079 |
| 1C | 430 | 410 | 0.155 | 0.11 | 0.122 | 0.079 |
| 1D | 430 | 410 | 0.155 | 0.11 | 0.122 | 0.079 |
| 1E | 430 | 410 | 0.155 | 0.11 | 0.122 | 0.079 |

The definitions are as follows:
T: Inlet temperature to and exit temperature from adiabatic prereformer
$Q_c$: Reaction quotient ($P^2_{H2}/P_{CH4}$) for reaction (4) at prereformer inlet and outlet temperature (and pressure) after establishment of equilibrium of steam reforming and shift reactions.
$K_p$: Equilibrium constant for reaction (4) at inlet and outlet temperature of prereformer.

It is seen from Tables 2a, 2b and 3 that the present invention provides considerable improvement.

Using the processes described in 1B–1E a considerable increase in the syngas productivity per unit of oxygen is found. In addition, the syngas production per unit of natural gas feed consumption is improved.

It should be noted that Examples 1A and 1F operate with the same total amount of steam injected. This illustrates that the invention is also useful at the same steam-to-carbon ratio providing increased productivity.

The optimal choice of tail gas addition cannot be judged only in terms of productivity. Examples 1C and 1D have the highest productivity, but also the largest recycle meaning that the recycle compressor investment increases. In addition, the temperature of the final synthesis gas is lowest in Examples 1C and 1D. This gives a smaller temperature approach in the heat exchange reformer and downstream heat exchanger thus increasing the relative cost(s) of these units.

In Table 3, the advantages of the present invention are further illustrated. In comparative Example 1A the reaction quotients, $Q_c$, are lower than the equlibrium constant, $K_p$, both at the inlet and the outlet of the prereformer. The opposite is the case in Examples 1B–1E of the present invention. This means that the present invention can be operated at a lower steam-to-carbon ratio (or with a larger margin to carbon formation) than the comparative Example 1A without risk of carbon formation in the prereformer for a given catalyst).

It should also be noted that there are no olefins in the feed to the prereformer because the tail gas is recycled to a location downstream. This is an advantage because olefins may cause rapid carbon formation on a catalyst. In example 1E and 1F the tail gases is injected at several location reducing the concentration of olefins at the reactor in-inlets. This is also a pronounced advantage of the present invention.

Example 2

This example is based on Example 1B with the modification that the flows are 100 times higher. The arrangement of the heat exchangers, reactors, the prereformer, and the heat exchange reformer are as for Example 1B. The difference is that 100,000 Nm$^3$/hr of natural gas is used as feed. The amount of additional steam added to the stream amounting to 20% of the prereformer effluent is 21300 Nm$^3$/hr.

In this case the duty required in the heat exchange reformer is 462 kcal/Nm$^3$ natural gas feed. The average heat flux to the heat exchange reformer is 75,000 kcal/m$^2$ inner tube surface/hr. The heat exchange reformer has a tubular geometry with a tube length of 10 meters.

This means that a total (inner) heat transmission surface of 6160 square meters.

Case 1: Inner tube diameter is 0.1 meter and catalyst particles with a diameter of 20 mm are used.

Case 2: Inner tube diameter is 0.05 meter and catalyst particles with a diameter of 10 mm are used.

Case 3: Inner tube diameter is 0.05 meter catalysed on the inner tube surface with a catalyst layer with a thickness of 0.05 mm.

Case 4: As case 3, but with a catalyst layer thickness of 0.1 mm.

Cases 5 and 6: As cases 3 and 4, but with an inner tube diameter of 0.02 meters.

Case 7: Inner tube diameter is 0.05 meter. The catalyst is a structured catalyst represented by a metallic cross-corrugated structure with a surface area of 900 m$^2$/m$^3$ reactor volume onto which a catalyst layer with a thickness of 0.05 mm has been placed.

Case 8: As case 7, but with an inner tube diameter of 0.02 meters.

The following definitions are used in table 4 below:
Pel: Pellets
TD: Inner tube diameter
$D_p$: Characteristic catalyst pellet diameter SCSA: Structured catalyst surface area per unit reactor volume
t: Catalyst layer thickness
RV: (Inner) Reactor volume
CV: Catalyst material Volume excl. void
NOT: Number of reformer tubes
DP: Pressure drop.

TABLE 4

| Case | Cat. Type | TD (m) | $D_p$ (mm) | SCSA $m^2/m^3$ | T (mm) | RV ($m^3$) | CV ($m^3$) | NOT | DP |
|---|---|---|---|---|---|---|---|---|---|
| 1 | Pel | 0.1 | 20 | — | — | 15.4 | 6.2[1] | 196 | High |
| 2 | Pel | 0.05 | 10 | — | — | 7.7 | 3.9[2] | 392 | v.hi |
| 3 | CH | 0.05 | — | — | 0.05 | 7.7 | 0.031 | 392 | Low |
| 4 | CH | 0.05 | — | — | 0.10 | 7.7 | 0.062 | 392 | Low |
| 5 | CH | 0.02 | — | — | 0.05 | 3.1 | 0.031 | 980 | Low/M |
| 6 | CH | 0.02 | — | — | 0.10 | 3.1 | 0.061 | 980 | Low/M |
| 7 | STC | 0.05 | — | 900 | 0.05 | 7.7 | 0.347 | 392 | M |
| 8 | STC | 0.02 | — | 900 | 0.05 | 3.1 | 0.140 | 980 | M |

[1]Void is 60%.
[2]Void is 50%.
M = Moderate

From Table 4 it is seen that the use of either catalysed hardware attached to the inner surface of the tube or structured catalysts have advantages in terms of pressure drop and catalyst amount.

The invention claimed is:

1. Process for the production of synthesis gas by catalytic steam reforming of a hydrocarbon containing feedstock in parallel in an autothermal steam reformer and in a plurality of steam reformers in series, the heat for the steam reforming reactions in the plurality of steam reformers being provided by indirect heat exchange with the combined effluents from the plurality of steam reformers with the autothermal steam reformer, and wherein carbon monoxide containing gas is added to the feedstock prior to the steam reforming in the autothermal steam reformer and/or prior to the steam reforming in the plurality of steam reformers, the carbon monoxide containing gas having a molar ratio of hydrogen to carbon of less than 4.5 and being added in an amount resulting in a product stream having a molar ratio of hydrogen to carbon monoxide of between about 1.8 and 2.3.

2. The process according to claim 1, wherein the plurality of steam reformers are adiabatic steam reformers and/or heat exchange steam reformers.

3. The process according to claim 2, wherein the feedstock to the plurality of adiabatic steam reformers is preheated by indirect heat exchange with the combined effluents from the plurality of steam reformers and the autothermal steam reformer.

4. The process according to claim 2, wherein the heat for the heat exchange reformer is provided by indirect heat exchange with the combined effluents from the plurality of steam reformers and the autothermal steam reformer.

5. The process according to claim 1, wherein catalyst in at least one of the steam reformers is in form of pellets or catalysed hardware.

6. The process according to claim 5, wherein the catalysed hardware is arranged on structured metallic or ceramic elements or on monoliths.

7. The process according to claim 1, wherein the active catalytic material in a first of the steam reformers is nickel and the active material in a last of the steam reformers is a noble metal or a mixture of noble metals.

8. The process according to claim 3, wherein the preheating is combined with catalytic steam reforming between at least one of the adiabatic steam reformers.

9. The process according to claim 1, wherein an oxidant to the autothermal steam reformer contains at least 90% oxygen by volume.

10. The process according to claim 1, wherein the carbon monoxide containing gas is tail gas from a Fischer-Tropsch process.

* * * * *